(12) United States Patent
Aul et al.

(10) Patent No.: US 11,584,401 B2
(45) Date of Patent: Feb. 21, 2023

(54) ADAPTER ASSEMBLY OF GENERATOR AND AXLE-END GENERATOR ASSEMBLY

(71) Applicant: Schaeffler Technologies AG & Co. KG, Herzogenaurach (DE)

(72) Inventors: Eduard Aul, Shanghai (CN); Ran Guan, Shanghai (CN); Zhihui Pan, Shanghai (CN); Ganjun Zhu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 427 days.

(21) Appl. No.: 16/620,340

(22) PCT Filed: Jun. 16, 2017

(86) PCT No.: PCT/CN2017/088817
§ 371 (c)(1),
(2) Date: Dec. 6, 2019

(87) PCT Pub. No.: WO2018/227634
PCT Pub. Date: Dec. 20, 2018

(65) Prior Publication Data
US 2021/0323586 A1    Oct. 21, 2021

(51) Int. Cl.
| | |
|---|---|
| *B61F 15/12* | (2006.01) |
| *B61D 43/00* | (2006.01) |
| *B61F 15/26* | (2006.01) |
| *H02K 5/02* | (2006.01) |
| *H02K 21/24* | (2006.01) |
| *B61F 15/22* | (2006.01) |

(Continued)

(52) U.S. Cl.
CPC ............. *B61D 43/00* (2013.01); *B61F 15/12* (2013.01); *B61F 15/22* (2013.01); *B61F 15/26* (2013.01); *H02K 5/02* (2013.01); *H02K 21/24* (2013.01); *H02K 1/182* (2013.01); *H02K 7/1861* (2013.01)

(58) Field of Classification Search
CPC ........ F16C 19/386; B61F 15/12; B61F 15/14; B61F 15/18; B61F 15/22; B61F 15/26; B61D 43/00; H02K 1/24; H02K 1/182; H02K 5/02; H02K 7/1861
See application file for complete search history.

(56) References Cited

U.S. PATENT DOCUMENTS

| | | | | |
|---|---|---|---|---|
| 1,804,193 | A * | 5/1931 | Winther ................. | B61D 43/00 322/1 |
| 2,433,022 | A * | 12/1947 | Brittain, Jr. ............. | B61F 15/12 105/96.1 |

(Continued)

FOREIGN PATENT DOCUMENTS

| | | |
|---|---|---|
| CN | 201151403 Y | 11/2008 |
| CN | 201457398 U | 5/2010 |

(Continued)

OTHER PUBLICATIONS

DE3204666A_description_translation.*

*Primary Examiner* — Phillip A Johnson

(57) ABSTRACT

The disclosure provides an adapter assembly of a generator and an axle-end generator assembly. An adapter assembly includes a first part configured to mount to a wagon bogie and a second part connecting to the first part. The first part and the second part are configured to form a base for mounting a stator of a generator together.

19 Claims, 6 Drawing Sheets

(51) Int. Cl.
  *H02K 1/18* (2006.01)
  *H02K 7/18* (2006.01)

(56) References Cited

U.S. PATENT DOCUMENTS

| | | | | |
|---|---|---|---|---|
| 3,382,017 | A * | 5/1968 | Cripe | B61F 15/12 384/582 |
| 3,672,735 | A * | 6/1972 | Keller et al. | F16C 35/04 384/459 |
| 5,440,184 | A * | 8/1995 | Samy | H02K 7/1846 310/90 |
| 8,696,212 | B2 * | 4/2014 | Hubbard | F16C 35/063 384/489 |
| 2008/0018110 | A1 | 1/2008 | Roth | |
| 2014/0159517 | A1 | 6/2014 | Furuya | |
| 2016/0012680 | A1 | 5/2016 | Angelis et al. | |
| 2016/0126806 | A1 | 5/2016 | Angelis | |
| 2016/0308418 | A1 | 10/2016 | Garvey et al. | |

FOREIGN PATENT DOCUMENTS

| | | | | |
|---|---|---|---|---|
| CN | 102190003 | A | 9/2011 | |
| CN | 102616246 | A | 8/2012 | |
| CN | 202743258 | | 3/2013 | |
| CN | 103023164 | A | 4/2013 | |
| CN | 103538596 | A | 1/2014 | |
| CN | 103872847 | A | 6/2014 | |
| CN | 105235704 | A | 1/2016 | |
| CN | 106505763 | A | 3/2017 | |
| CN | 110365155 | A * | 10/2019 | |
| DE | 2551009 | A1 * | 5/1977 | |
| DE | 3204666 | A * | 10/1983 | B60K 25/08 |
| EP | 0844724 | A1 | 5/1998 | |
| EP | 3043083 | A1 | 7/2016 | |
| NL | 9100701 | A * | 11/1992 | B61F 15/12 |
| RU | 2094269 | C1 | 10/1997 | |
| RU | 69004 | U1 | 12/2007 | |
| RU | 2377150 | C1 | 12/2009 | |
| RU | 146904 | U1 | 10/2014 | |
| SU | 1427495 | A1 | 9/1988 | |

* cited by examiner

ADAPTER ASSEMBLY OF GENERATOR AND AXLE-END GENERATOR ASSEMBLY

CROSS-REFERENCE TO RELATED APPLICATIONS

This application is the United States National Phase of PCT Appln. No. PCT/CN2017/088817 filed Jun. 16, 2017, the entire disclosure of which is incorporated by reference herein.

TECHNICAL FIELD

This disclosure relates to an adapter assembly of a generator and an axle-end generator assembly.

BACKGROUND

Railway freight wagons used to have no electric power supplier, because in the past few electrical applications were implemented on railway freight wagons. However, with the development of the railway freight wagons, more sensors and mechatronics parts are implemented on the freight wagons, and the electric power solution becomes a critical demand.

A disc type permanent magnet generator has been proposed as the electric power supplier for railway freight wagons. The disc type generator is an easy-mounting, reliable and economical power supply solution for railway applications. The disc type generator can be mounted onto a wagon bogie via fitting to an axle box, which is robust in the operation condition.

The disc type generator has a rotor and a stator. The rotor is mounted to an axle end, and thus the generator can also be called as an axle-end generator. The stator of the axle-end generator needs to be mounted to a stable and strong position, and in addition, the mounting position should have precisely controlled manufacturing tolerance and assembly tolerance.

The axle box is a good position to mount the stator. FIG. 1A schematically shows a front face of the generator mounting position, while FIG. 1B schematically shows the mounting structure from a side in which the axle box is partly peeled to expose the rotor mounting position.

As shown in FIGS. 1A and 1B, the mounting structure for the axle-end generator includes an axle box 1 which can be mounted to the wagon bogie, and an axle 2 which is rotatable relative to the axle box 1. An end of the axle 2 is surrounded by the axle box 1.

A rotor 4 of the generator is mounted to the end surface of the axle 2 by screws (not shown) via screw holes 21 formed in the end of the axle 2. A stator 5 is mounted to an end surface of the axle box 1 by screws (not shown) via screw holes 11 formed at four corners of the end of the axle box 1. There is a gap between the rotor 4 and the stator 5.

The axle box 1 supports the bogie payload, from both up and down sides. This mounting structure provides a stable operation condition for the generator.

However, most wagon bogies have no axle box structure, instead, they use (conventional) adapter. The adapter supports the bogie payload. FIG. 2A schematically shows a front face of a supposed generator mounting position, while FIG. 2B schematically shows the supposed mounting structure from a side in which the adapter is partly peeled to expose the rotor mounting position.

As shown in FIGS. 2A and 2B, the supposed mounting structure for the axle-end generator includes an adapter 6 which can be mounted to the wagon bogie, and an axle 2 which is rotatable relative to the adapter 6. An end of the axle 2 is partly surrounded by the adapter 6.

A rotor 4 of the generator is mounted to the end surface of the axle 2 by screws (not shown) via screw holes 21 formed in the end of the axle 2. A stator 5 is mounted to an end surface of the adapter 6 by two screws (not shown) via two screw holes 61 formed in the end of the adapter 6.

Such a conventional adapter gives a big challenge to the railway axle-end generator operation, because the stator 5 is only supported from one side (upper side in FIGS. 2A and 2B). The asymmetric mounting structure results in inevitable vibration and drifting of the stator 5, and thus the railway generator may be easily damaged. Therefore, it seems difficult to implement the railway axle-end generator onto the wagon bogie using the conventional adapter.

SUMMARY

In view of the above condition, this disclosure provides an adapter assembly and an axle-end generator assembly. This disclosure provides an adapter assembly including a first part configured to mount to a wagon bogie and a second part connecting to the first part. The first part and the second part are configured to form a base for mounting a stator of a generator together.

As an option, the first part and the second part are connected to each other with end portions thereof contacting to each other. As an option, the first part and the second part are connected to each other by at least one of the following members: a screw, a bolt, a fastener, a rivet, and a hoop. As an option, the first part and the second part are connected to each other though bars. As an option, the bars and the first part or the second part are formed as one single piece, and the bars extend from the first part or the second part toward the second part or the first part. As an option, the bars are mounted to the first part and/or the second part by at least one of the following members: a screw, a bolt, a fastener, and a rivet. As an option, the first part and the second part are connected to each other directly. As an option, the first part and the second part are connected to each other indirectly.

This disclosure also provides an axle-end generator assembly including the adapter assembly mentioned here. The generator assembly includes a rotor mounted to an end of the axle, and the stator mounted to both the first part and the second part. As an option, the stator is mounted to an end surface of the adapter assembly in the axial direction. As an option, the stator is mounted to the adapter assembly by at least one of the following members: a screw, a bolt, a fastener, and a rivet. As an option, the stator is mounted to the adapter assembly at four corners of the end surface. As an option, the stator is mounted to the first part and the second part by the same or different members.

As an option, the number of the mounting points between the first part and the stator is the same as that between the second part and the stator. As an option, the mounting points between the first part and the stator and the mounting points between the second part and the stator are disposed symmetrically. As an option, the mounting points between the stator and the adapter assembly are disposed around the axle at the same interval.

As an option, the generator assembly includes a backing ring and seal wear rings, and a bearing disposed between the adapter assembly and the axle. The backing ring, the seal wear rings and the rotor fix the bearing along the axle. As an option, the backing ring, the seal wear rings and the rotor fix an inner ring of the bearing, and an outer ring of the bearing fixes the adapter assembly. As an option, the rotor has a shape of disc, and the stator faces the rotor in the axial direction. As an option, the first part is mounted to the wagon bogie at an upper side of the axle, and the second part is connected to the first part by screws at a lower side of the axle.

In the adapter assembly and the axle-end generator assembly according to this disclosure, the adapter assembly includes a first part configured to mount to a wagon bogie and a second part connected to each other, and a stator of the generator can be (or is) mounted to both the first part and the second part. Therefore, the stator and thus the generator can be mounted to the wagon bogie stably. Further features of this disclosure will become apparent from the following description of exemplary embodiments with reference to the attached drawings.

DETAILED DESCRIPTION

The following describes exemplary embodiments of this disclosure with reference to the attached drawings.

Figure 1A:
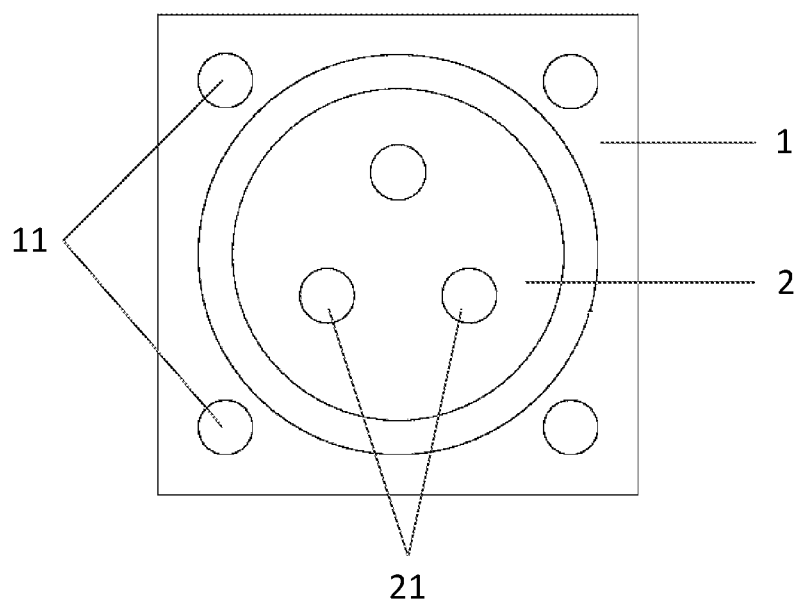
FIG. 1A schematically shows a front face of a generator mounting position, while FIG. 1B schematically shows the mounting structure from a side, in which an axle box is partly peeled to expose a rotor mounting position.
Figure 1B:
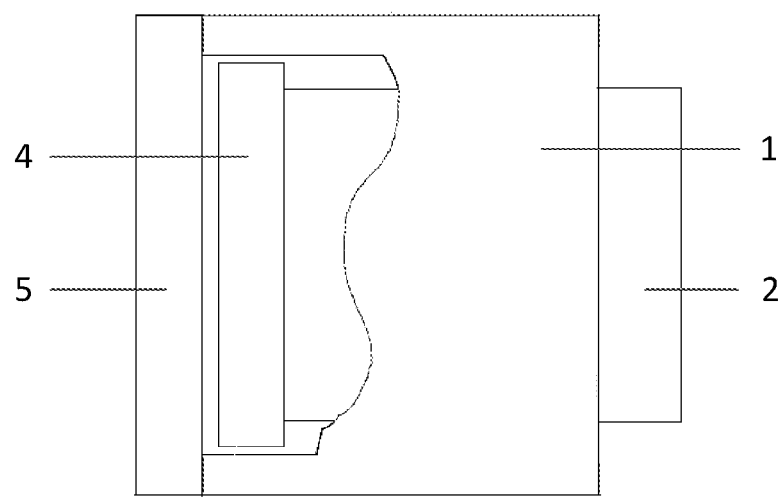
Figure 2A:
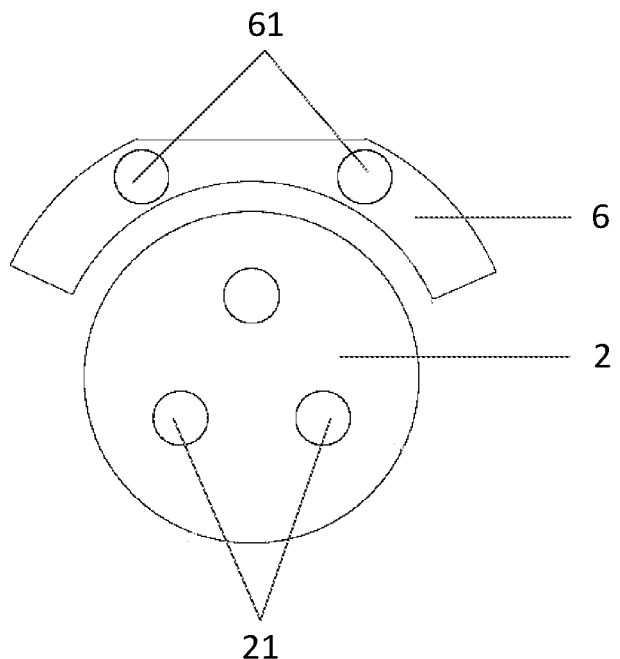
FIG. 2A schematically shows a front face of a supposed generator mounting position, while FIG. 2B schematically shows the supposed mounting structure from a side, in which an adapter is partly peeled to expose a rotor mounting position.
Figure 2B:
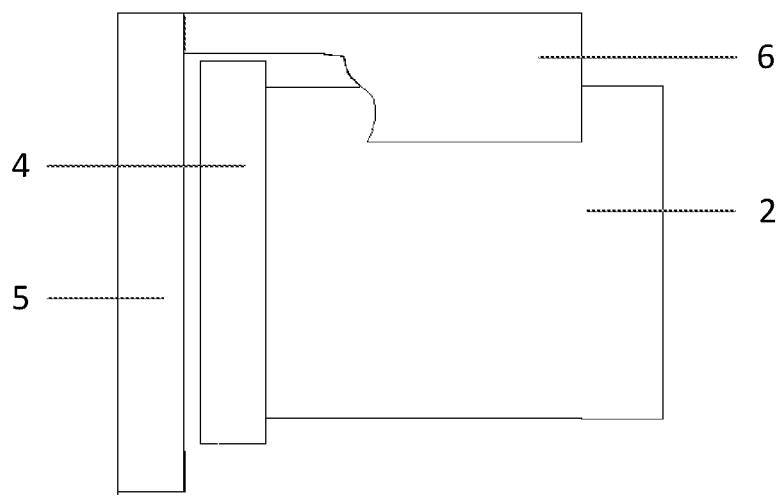
Figure 3A:
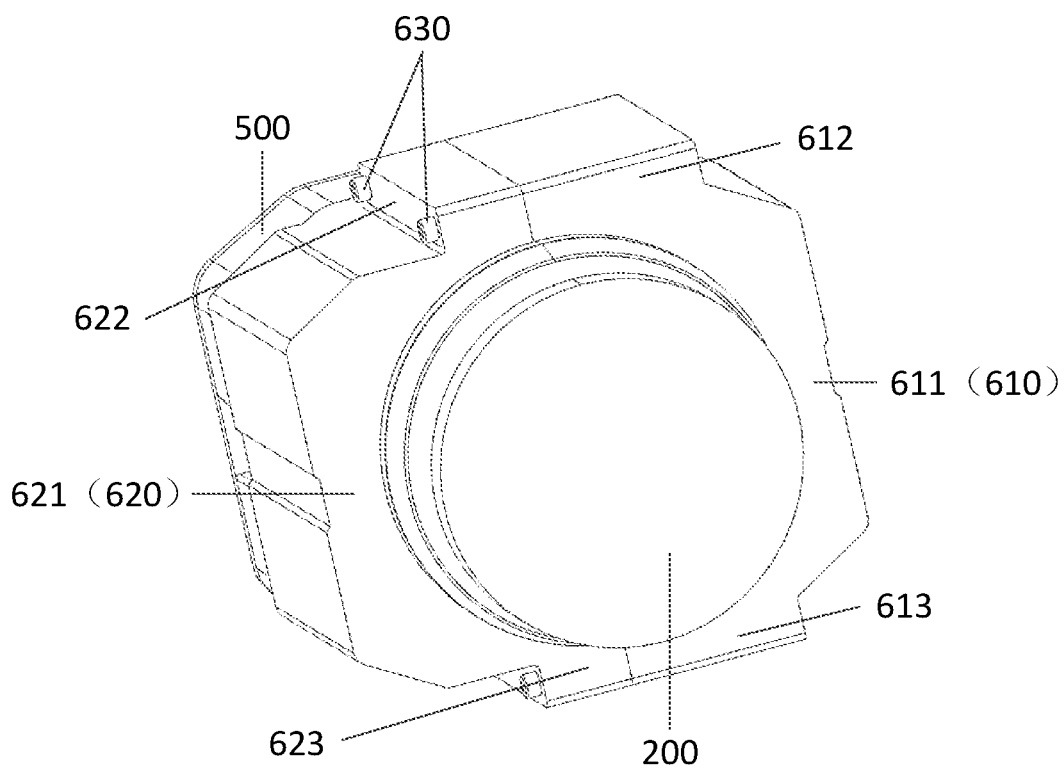
FIGS. 3A and 3B schematically show a railway axle-end generator assembly in the first embodiment of this disclosure in perspective views.
Figure 3B:
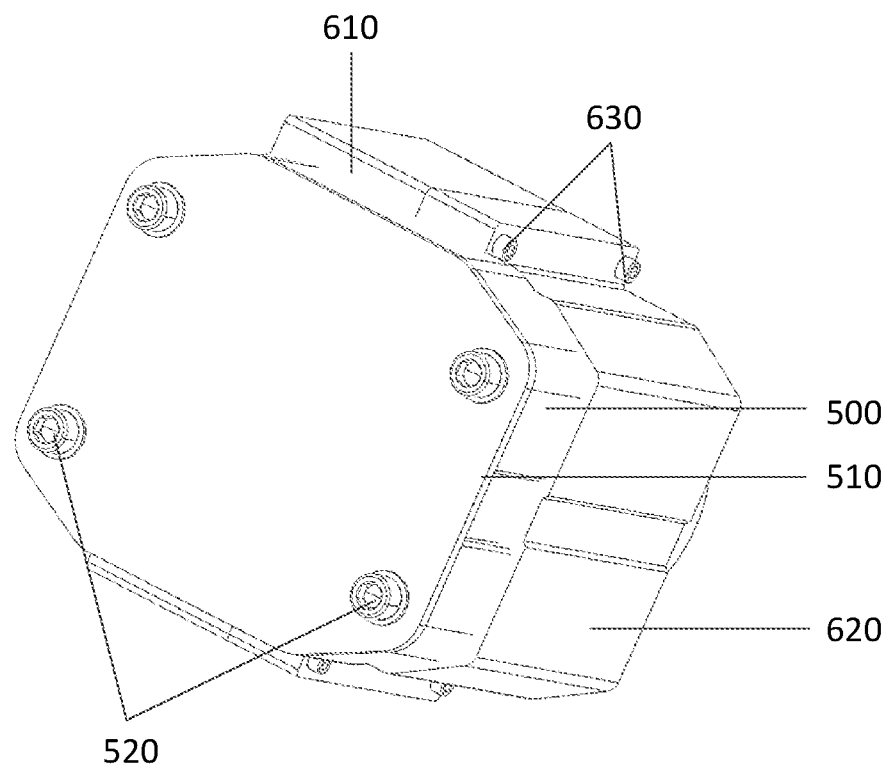

As shown in FIGS. 3A and 3B, the axle-end generator assembly of this embodiment has an adapter assembly. The adapter assembly has a partition structure including a first part 610 obtained by modifying the conventional adapter, and a second part 620 connecting to the first part 610 via screws 630. The first part 610 can be mounted to the wagon bogie through a groove 614 formed thereon (see FIG. 4C), for example, in a similar manner as the conventional adapter. Together, the first part 610 and the second part 620 form a base for mounting a stator of the axle-end generator.

In this embodiment, the first part 610 is an upper part and can support the bogie payload, and the second part is a lower part and doesn't support the bogie payload. This disclosure however is not limited to this, the first part 610 and the second part 620 can also be a right part and a left part, respectively. The first and second parts 610, 620 can also separate from each other in other directions.

The two parts 610 and 620 can be made of, for example, metal such as steel, and form the adapter assembly that is strong enough to mount the axle-end generator.

To be specific, the first part 610 has a length extending along an axial direction of an axle 200 a part of which is surrounded by the adapter assembly. The first part 610 has a center portion 611 and two end portions 612 and 613 in a circumferential direction of the axle 200. Screw holes for the screws 630 are formed in the end portions 612 and 613.

The second part 620 has a similar structure as the first part 610, and they surround the axle 200 in 360° together. The second part 620 has a center portion 621 and two end portions 622 and 623 in the circumferential direction of the axle 200. Through holes are formed in the end portions 622 and 623.

Screws 630 penetrate the through holes and screw into the screw holes to fix the first part 610 and the second part 620 together.

The first part 610 can surround the axle 200 over the same range as that of the second part 620 or over a different range than that of the second part 620.

Figure 4A:
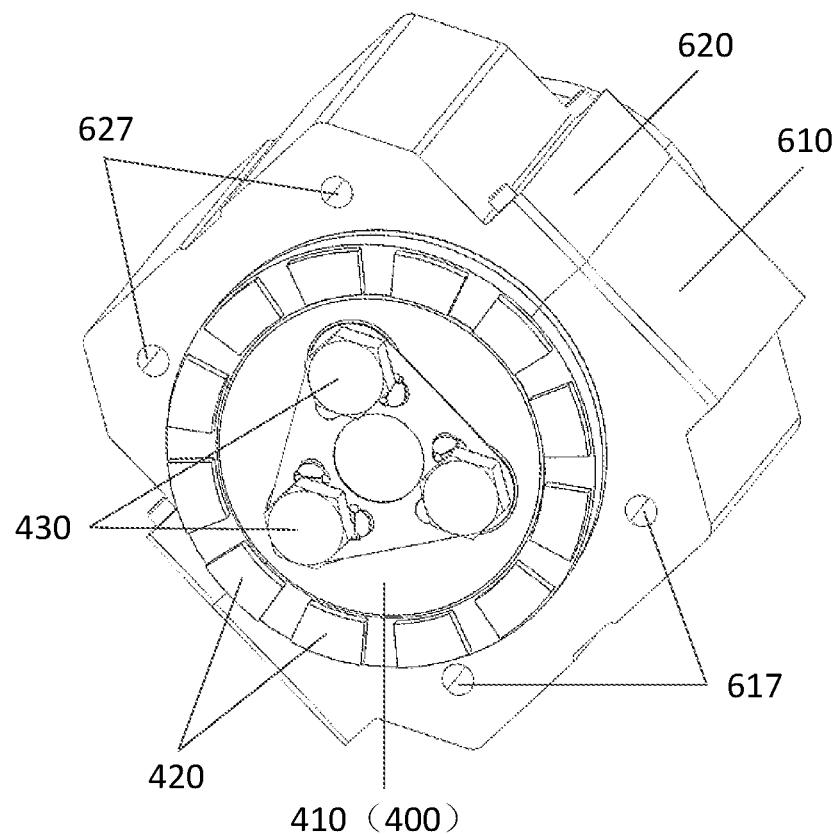
FIGS. 4A, 4B and 4C schematically show the railway axle-end generator assembly in FIGS. 3A and 3B, wherein some members are omitted to show the inner structure of the generator assembly.
Figure 4B:
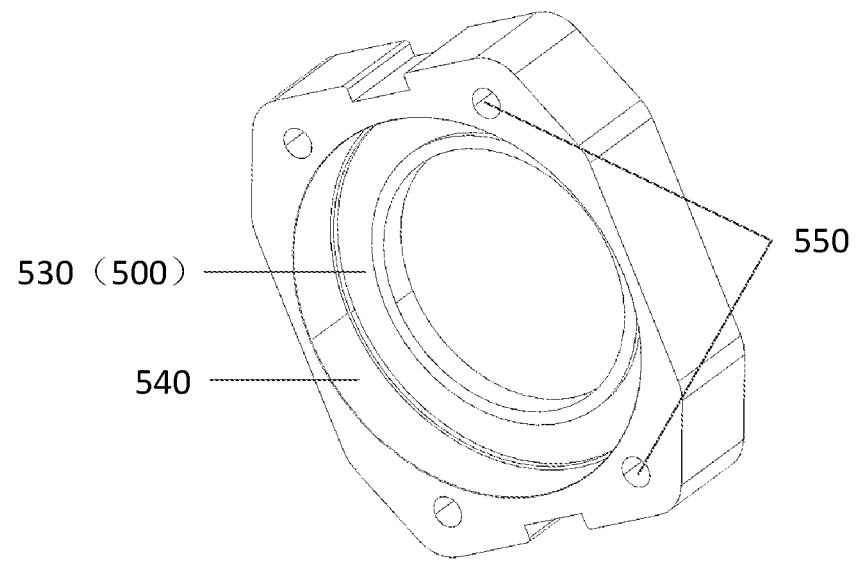

The axle-end generator assembly also includes a generator having a stator 500 mounted to the adapter assembly by screws 520. There is also a cover 510 mounted to the adapter assembly by the screws 520, in order to close the end in the axial direction of the adapter assembly and/or the stator 500. As shown in FIGS. 4A and 4B, the screws 520 penetrate though holes 550 in the stator 500 and are screwed to screw holes 617, 627 in the first and second parts 610, 620.

The number of the screws 520 is not limited to that shown in the figures. The number is preferably three or more, and the screws 520 should be mounted to both the first part 610 and the second part 620, such that the stator 500 is fixed at both upper and lower sides of the axle 200.

The mounting points between the first part 610 and the stator 500 and the mounting points between the second part 620 and the stator 500 can be disposed symmetrically. As one option, the mounting points between the stator 500 and the adapter assembly can dispose around the axle 200 at the same interval.

Figure 4C:
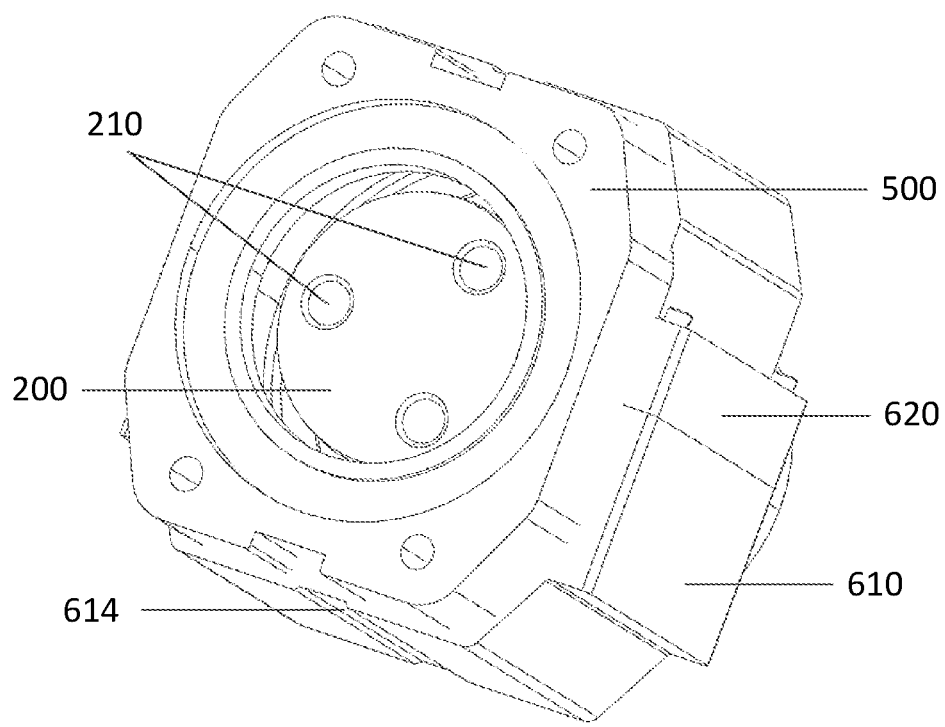

FIGS. 4A to 4C show further details of the axle-end generator assembly. In FIG. 4A, the cover 510 and the stator 500 are omitted to show a rotor 400 of the generator, in FIG. 4B, only the stator 500 is shown, and in FIG. 4C, the rotor 400 is also omitted.

As can be found in FIG. 4A, the rotor 400 has a substrate 410 and a plurality of magnets 420 attached to the substrate 410. The rotor 400 is mounted on an end surface of the axle 200 by screws 430.

In one example not illustrated, the magnets 420 can be attached to slots formed in the substrate 410. The slots can especially have a dove tail structure and can prevent the magnets 420 separating from the substrate 410 in the axial direction.

As shown in FIG. 4B, the stator 500 may include a stator body 530 facing the rotor 400 in the axial direction, and an annular protrusion 540 extending from the outer portion in the radial direction of the stator body 530. The annular protrusion 540 surrounds at least a part of the rotor 400 (see FIG. 4D).

In FIG. 4C, screw holes 210 formed in the axle 200 for fastening the rotor 400 on the axle 200 by the screws 430 are shown.

Figure 4D:
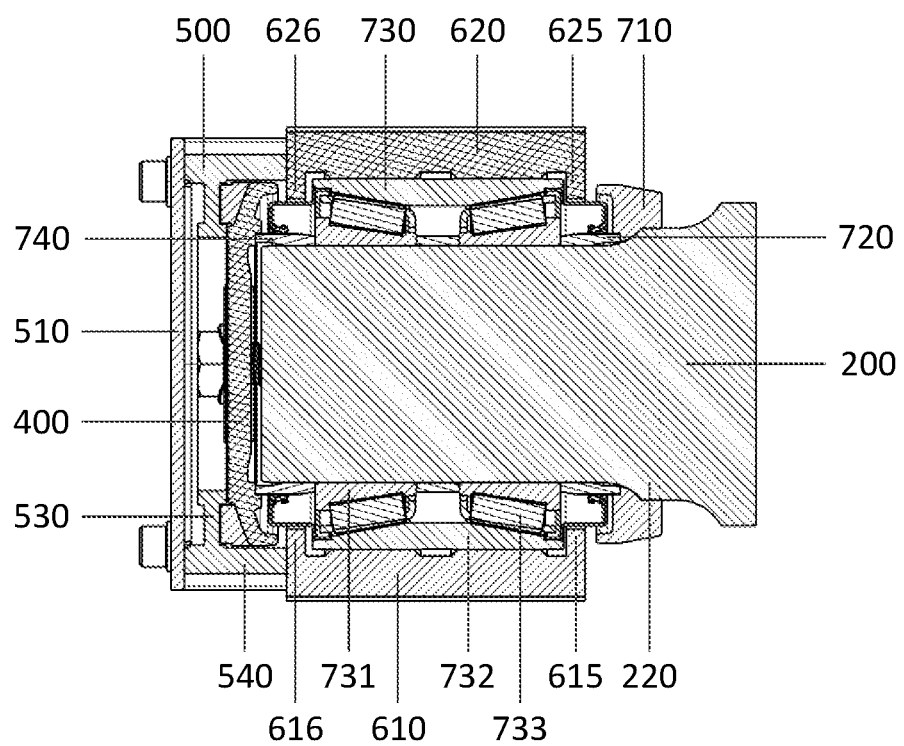
FIG. 4D schematically shows a cross section of the generator assembly along an axial direction of an axle of the generator assembly.

FIG. 4D shows a cross section of the generator assembly along the axial direction. As shown in FIG. 4D, the first part 610 and the second part 620 are mounted to the axle 200 by a bearing 730. The bearing 730 has an inner ring 731 mounted to the axle 200, an outer ring 732 mounted to the first part 610 and the second part 620, and rollers 733 between the inner ring 731 and the outer ring 732.

The first part 610 has two semi-annular protuberances 615, 616 located at both ends in the axial direction. The protuberances 615, 616 extend toward an inner side in a radial direction of the axle 200. The outer ring 732 of the bearing 730 is adapted to the space between the two protuberances 615, 616 and thus the outer ring 732 fixes the first part 610 in the axial direction.

The second part 620 has two semi-annular protuberances 625, 626 located at two ends in the axial direction, similarly to that of the first part 610, and thus the outer ring 732 of the bearing 730 fixes the second part 620 in the axial direction.

A backing ring 710 and a first seal wear ring 720 are mounted to the axle 200, and the backing ring 710 and the inner ring 731 of the bearing 730 sandwiches the first seal wear ring 720 in the axial direction. A second seal wear ring 740 is interposed between the inner ring 731 of the bearing 730 and the rotor 400, such that the backing ring 710, the first seal wear ring 720, the second seal wear ring 740 and the rotor 400 fix the inner ring 731 of the bearing 730 in the axial direction.

It should be noted that the position of the backing ring 710 is defined by the axle 200 though an increased-diameter-portion 220 of the axle 200. The backing ring 710, the first seal wear ring 720, the second seal wear ring 740 and the bearing 730 can be that used in the prior art.

The first part 610 and the second part 620 have a similar structure, and they can replace each other in principle. For easy assembly of the screws 630 (see, for example, FIG. 3A), however, the second part 620 having though holes for the screws 630 functions as the lower part, such that enough space presents for fastening the screws 630.

Figure 5A:
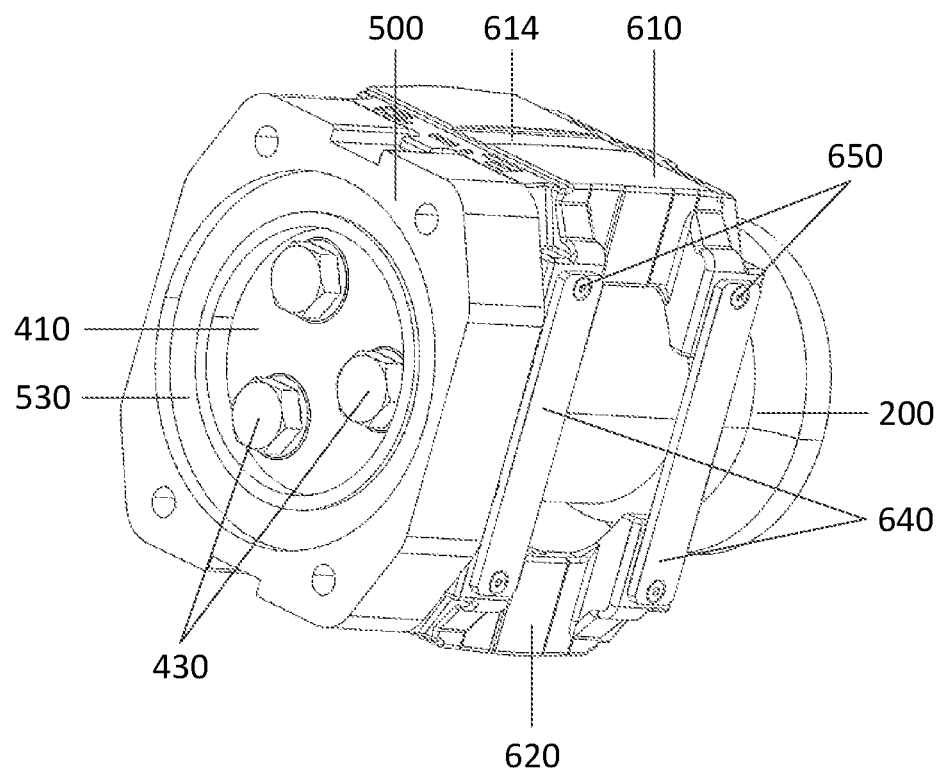
FIGS. 5A and 5B schematically show a railway axle-end generator assembly in the second embodiment of this disclosure in perspective views.
Figure 5B:
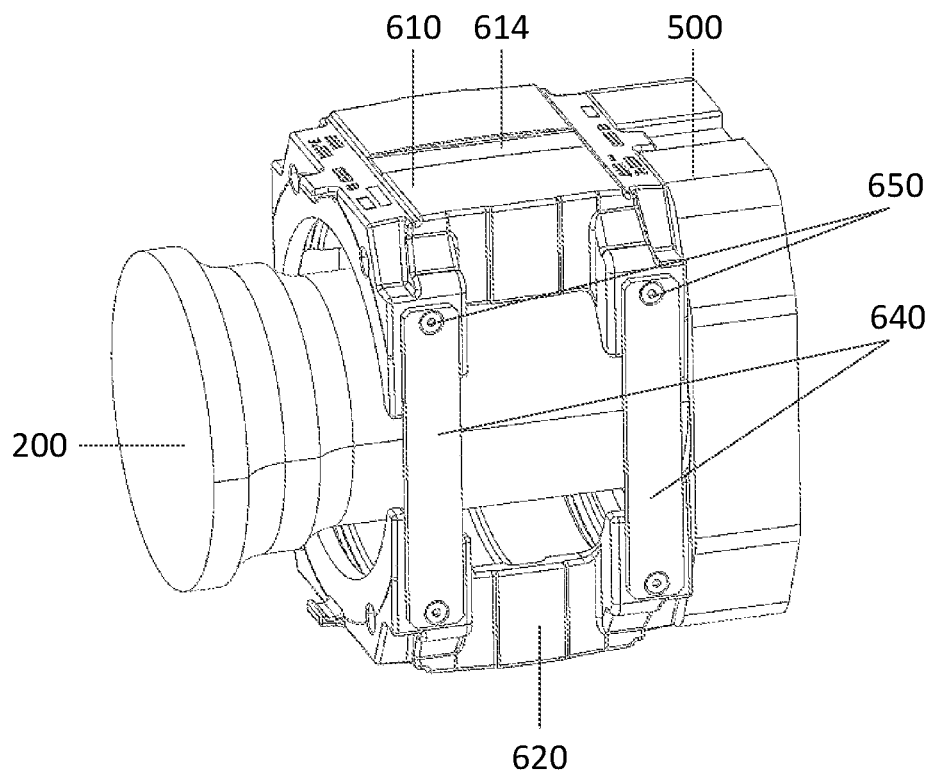

FIGS. 5A and 5B schematically show an axle-end generator assembly in the second embodiment of this disclosure. In FIGS. 5A and 5B, some members of the generator assembly are omitted to show the structure clearly.

This embodiment has a similar concept as that of the first embodiment and only the differences therebetween will be described hereinafter.

As shown in FIGS. 5A and 5B, the adapter assembly has a partition structure including a first part 610 obtained by modifying the conventional adapter and a second part 620 connecting to the first part 610. This first part 610 can be mounted to the wagon bogie through a groove 614 formed thereon, and the first part 610 supports the bogie payload. The second part 620 doesn't support the bogie payload. The first part 610 and the second part 620 have a similar structure and can replace each other.

Instead of surrounding the axle 200 around 360° in the first embodiment, in this embodiment, the first part 610 and the second part 620 each surround the axle 200 less than 180°, so they do not contact each other directly.

In this embodiment, the first part 610 and the second part 620 are connected to each other by four bars 640 in a form of elongated metal plates. Each bar 640 connects the first part 610 and the second part 620 by screws 650, such that the four bars 640 are arranged at two opposite sides of the axle 200 and in each side two of them. As an option, the bars 640 can extend from the first part 610 or the second part 620. In other words, the bars 640 and the first or second part can be formed as one single piece.

In this embodiment, the weight of the first part 610 and/or the second part 620 can be reduced.

An adapter assembly with a partition structure is provided to replace the conventional adapter with a single-piece structure, which enables the axle-end generator implementation without changing the wagon bogie design. As the stator 500 can be mounted on the adapter assembly at both upper and lower sides of the axle 200, the stator 500 and thus the generator can be mounted to the wagon bogie stably. The mechanical mounting property of the first and second embodiments is comparable with the "axle box mounting".

While this disclosure has been described with reference to exemplary embodiments, it is to be understood that this disclosure is not limited to the disclosed exemplary embodiments. The disclosure also encompasses all such modifications and equivalent structures and functions. For example, this disclosure is not limited to the railway axle-end generator, and the solutions and concepts of this disclosure can also be applied to other similar applications. The axle-end generator is not limited to the disc type generator, it can also be a conventional generator in which the rotor is located inside of the stator or surrounds the stator circumferentially.

In the first embodiment, the first part 610 and the second part 620 can be connected to each other by other members such as a bolt, a fastener, a rivet, a hoop, and a mixture thereof. Two end portions 622, 623 of the second part 620 can be connected to the two end portions 612, 613 of the first part 610 by the same member or different members. For example, the end portion 622 can be connected to the end portion 612 by fasteners, such as hooks and recesses, and the end portion 623 can be connected to the end portion 613 by screws or bolts.

Similarly, in the second embodiment, the bars 640 can be mounted to the first part 610 and/or the second part 620 by other members such as a bolt, a fastener, a rivet, and a mixture thereof.

As illustrated in the first embodiment, the first part 610 and the second part 620 can be connected to each other directly, which means there is no other members between the first part 610 and the second part 620. As illustrated in the second embodiment, the first part 610 and the second part 620 can be connected to each other indirectly, which means other members such as the bars or connecting members (not shown) or spacing members (not shown) are located between the first part 610 and the second part 620.

The stator 500 can be mounted to the adapter assembly by other members such as a bolt, a fastener, a rivet, and a mixture thereof. And the stator 500 can be mounted to the first part 610 and the second part 620 by the same or different members.

REFERENCE NUMERALS 1 axle box
2 axle
4 rotor
5 stator
6 adapter
11 screw hole
21 screw hole
61 screw hole
200 axle
210 screw hole
220 increased-diameter-portion
400 rotor
410 substrate
420 magnet
430 screw
500 stator
510 cover
520 screw
530 stator body
540 annular protrusion
550 through hole 610 first part
611 center portion
612, 613 end portion
614 groove
615, 616 protuberance
617 screw hole
620 second part
621 center portion
622, 623 end portion
625, 625 protuberance
627 screw hole
630 screw
640 bar
650 screw
710 backing ring
720 first seal wear ring
730 bearing
731 inner ring
732 outer ring
733 roller
740 second seal wear ring

What is claimed is:

1. An axle-end generator assembly comprising:
an adapter assembly comprising a first part configured to mount to a wagon bogie and a second part connecting to the first part, the first part and the second part together being configured to form a base for mounting a stator of a generator;
a rotor mounted to an end of an axle; and
the stator mounted to both the first part and the second part at four corners of an end surface of the adapter assembly in an axial direction.

2. The axle-end generator assembly according to claim 1, wherein the first part and the second part are connected to each other with end portions thereof contacting to each other.

3. The axle-end generator assembly according to claim 1, wherein the first part and the second part are connected to each other by members selected from the group consisting of a screw, a bolt, a fastener, a rivet, or a hoop.

4. The axle-end generator assembly according to claim 1 further comprising bars, wherein the first part and the second part are connected to each other through the bars.

5. The axle-end generator assembly according to claim 4, wherein the bars and the first part or the second part are formed as one single piece, and the bars extend from the first part or the second part toward the second part or the first part.

6. The axle-end generator assembly according to claim 4, wherein the bars are mounted to the first part or the second part by a member selected from the group consisting of a screw, a bolt, a fastener, or a rivet.

7. The axle-end generator assembly according to claim 1, wherein the first part and the second part are connected to each other directly.

8. The axle-end generator assembly according to claim 1, wherein the first part and the second part are connected to each other indirectly.

9. The axle-end generator assembly according to claim 1, wherein the stator is mounted to the adapter assembly by members selected from the group consisting of a screw, a bolt, a fastener, or a rivet.

10. The axle-end generator assembly according to claim 9, wherein the stator is mounted to the first part and the second part by the members.

11. The axle-end generator assembly according to claim 1, wherein a first number of first mounting points between the first part and the stator is equal to a second number of second mounting points between the second part and the stator.

12. The axle-end generator assembly according to claim 1, wherein first mounting points between the first part and the stator and second mounting points between the second part and the stator are disposed symmetrically.

13. The axle-end generator assembly according to claim 1, wherein mounting points between the stator and the adapter assembly are evenly disposed around the axle.

14. The axle-end generator assembly according to claim 1, wherein the axle-end generator assembly further comprises
a backing ring and seal wear rings, and
a bearing disposed between the adapter assembly and the axle, wherein the backing ring, the seal wear rings and the rotor fix the bearing along the axle.

15. The axle-end generator assembly according to claim 14, wherein the backing ring, the seal wear rings and the rotor fix an inner ring of the bearing, and an outer ring of the bearing fixes the adapter assembly.

16. The axle-end generator assembly according to claim 1, wherein the rotor has a shape of disc, and the stator faces the rotor in an axial direction.

17. The axle-end generator assembly according to claim 1, wherein the first part is mounted to the wagon bogie at an upper side of the axle, and the second part is connected to the first part by screws at a lower side of the axle.

18. An axle-end generator assembly comprising:
an adapter assembly comprising a first part configured to mount to a wagon bogie and a second part connecting to the first part, the first part and the second part together being configured to form a base for mounting a stator of a generator;
a rotor mounted to an end of an axle; and
the stator mounted to both the first part and the second part, wherein a first number of first mounting points between the first part and the stator is equal to a second number of second mounting points between the second part and the stator.

19. An axle-end generator assembly comprising:
an adapter assembly comprising a first part configured to mount to a wagon bogie and a second part connecting to the first part, the first part and the second part together being configured to form a base for mounting a stator of a generator;
a rotor mounted to an end of an axle; and
the stator mounted to both the first part and the second part, wherein first mounting points between the first part and the stator and second mounting points between the second part and the stator are disposed symmetrically.

* * * * *